US005641964A

United States Patent [19]

Taniguchi

[11] Patent Number: 5,641,964

[45] Date of Patent: Jun. 24, 1997

[54] INFRARED HUMAN BODY DETECTOR

[75] Inventor: Yoshiharu Taniguchi, Tottori, Japan

[73] Assignee: Nippon Ceramic Co., Ltd., Tottori, Japan

[21] Appl. No.: 505,214

[22] PCT Filed: Jan. 28, 1994

[86] PCT No.: PCT/JP94/00126

§ 371 Date: Jul. 28, 1995

§ 102(e) Date: Jul. 28, 1995

[87] PCT Pub. No.: WO94/17377

PCT Pub. Date: Aug. 4, 1994

[30] Foreign Application Priority Data

Jan. 29, 1993 [JP] Japan .................................... 5-034770

[51] Int. Cl.[6] ............................... G01J 5/08; G01B 11/10

[52] U.S. Cl. ....................................... 250/353; 250/DIG. 1

[58] Field of Search ............................... 250/353, DIG. 1, 250/338.1, 221

[56] References Cited

U.S. PATENT DOCUMENTS 4,644,147 2/1987 Züblin .

FOREIGN PATENT DOCUMENTS 3812969 4/1988 Germany ......................... 250/DIG. 1
62-98225 5/1987 Japan .

*Primary Examiner*—Michael J. Tokar
*Assistant Examiner*—Virgil O. Tyler
*Attorney, Agent, or Firm*—Weiner, Carrier & Burt, P.C.; Joseph P. Carrier; Irving M. Weiner

[57] ABSTRACT

An infrared human body detector has an infrared detector (PE) having at least one light-detecting surface and disposed in a plane, groups of divided infrared ray converging members (LR and LD) disposed in the plane about the infrared detector in surrounding relation thereto, a primary reflecting mirror member ($M_1$ or $M_1'$) disposed inwardly of the groups of divided infrared ray converging members for reflecting, in a primary fashion, rays (B) applied inwardly through the respective groups of divided infrared ray converging members, and a secondary reflecting mirror member ($M_2$) disposed inwardly of the groups of divided infrared ray converging members for introducing the reflected rays from the primary reflecting mirror member within a sensitive angle of the infrared detector to apply the rays to the light-detecting surfaces thereof, the secondary reflecting mirror member having a reflecting surface sufficiently small as compared with the surface areas of the infrared ray converging members.

20 Claims, 8 Drawing Sheets

FIG. 11 (a) PRIOR ART
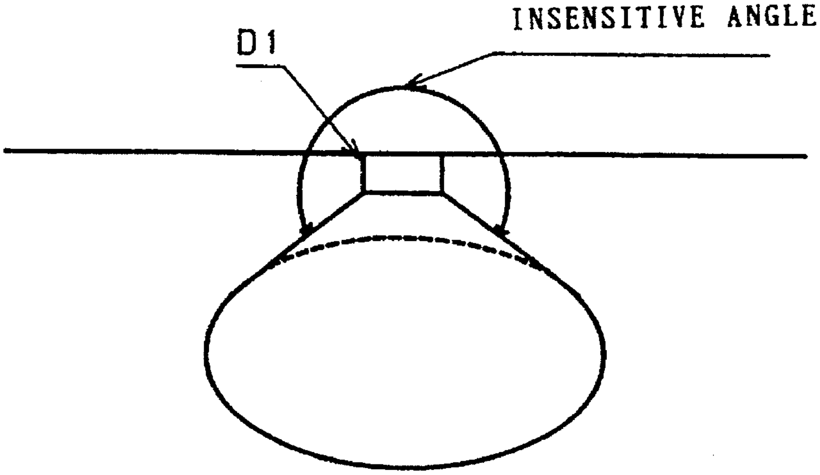
FIG. 11 (b) PRIOR ART
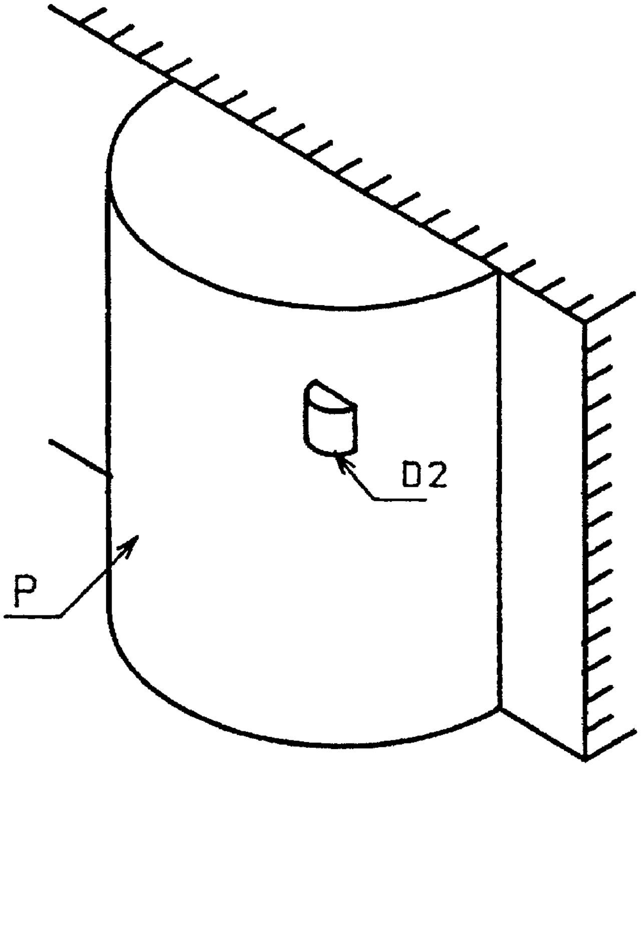

INFRARED HUMAN BODY DETECTOR

TECHNICAL FIELD

The present invention relates to an infrared human body detector having a wide sensitive angle.

BACKGROUND ART

One conventional infrared human body detector which has a wider sensitive angle than ordinary infrared human body detectors and has been evaluated as excellent is disclosed in U.S. Pat. No. 4,644,147. The disclosed infrared human body detector has a sensitive angle which is 90 degrees on both sides of a central sensitivity axis of the detector. The disclosed infrared human body detector is suitably mounted on a flat wall or ceiling.

There has not been available an infrared human body detector having a sensitive angle ranging from 180 to 270 degrees, suitable in an arrangement as shown in FIG. 4 of the accompanying drawings for monitoring an entire region P around a rectangular house H with infrared human body detectors S, nor has there been an infrared human body detector having a sensitive angle ranging from 270 to 360 degrees for monitoring a large room with a high ceiling, a garden, or the like. To monitor these areas, a plurality of infrared human body detectors have to be combined with each other, but such a combination is very uneconomical. Specifically, for monitoring a corner (270 degrees) of a house with infrared human body detectors, it has heretofore been necessary to install two infrared human body detectors, each having a sensitive angle of 180 degrees, on respective surfaces that jointly make up the corner. This system is highly disadvantageous because the price of the required infrared human body detectors and the expenses needed to install them are about twice those which would be necessary to employ one infrared human body detector.

Monitoring a large room with a high ceiling, a garden, or the like with a conventional infrared human body detector D2, as shown in FIG. 11(*b*) of the accompanying drawings, having a sensitive angle of 180 degrees, is also highly disadvantageous in that the initial and running costs are about twice those of an infrared human body detector according to the present invention for the reasons described above.

DISCLOSURE OF THE INVENTION

It is an object of the present invention to provide an infrared human body detector for detecting movement of a human body or the like in a monitored area, the infrared human body detector having a sensitive angle of 180 degrees or greater suitable for monitoring a house, a large room with a high ceiling, a garden, or the like, or a wider sensitive angle ranging from 270 to 360 degrees, for thereby reducing the initial and running costs thereof to about half those of the conventional infrared human body detectors.

According to the present invention, there is provided an infrared human body detector comprising:

an infrared detector having at least one light-detecting surface and disposed in a plane;

groups of divided infrared ray converging members disposed in the plane about the infrared detector in surrounding relation thereto;

primary reflecting mirror means disposed inwardly of the groups of divided infrared ray converging members for reflecting, in a primary fashion, rays applied inwardly through the respective groups of divided infrared ray converging members; and secondary reflecting mirror means disposed inwardly of the groups of divided infrared ray converging members for introducing the reflected rays from the primary reflecting mirror means within a sensitive angle of the infrared detector to apply the rays to the light-detecting surfaces thereof, the secondary reflecting mirror means having a reflecting surface sufficiently small as compared with the surface areas of the infrared ray converging members.

The groups of divided infrared ray converging members may comprise groups of Fresnel lenses, for example, the Fresnel lenses being disposed concentrically about the infrared detector in an angle of at least about 270 degrees.

If the infrared detector comprises a planar detecting member having light-detecting surfaces on its opposite principal surfaces which extend in a direction perpendicular to the plane referred to above, then the secondary reflecting mirror means includes secondary reflecting surfaces disposed in respective left- and right-hand positions on opposite sides of the axis of the planar detecting member, and each of the secondary reflecting surfaces is disposed adjacent to at least one of some of the infrared ray converging members disposed in confronting relation to one of the light-detecting surfaces on the sides corresponding to the secondary reflecting surfaces. The primary reflecting mirror means includes primary reflecting surfaces disposed at least one on each side of the axis of the planar detecting member, and each of the primary reflecting surfaces is arranged to reflect incident rays from the infrared ray converging members disposed in the direction in which one of the light-detecting surfaces extends on the sides corresponding to the primary reflecting surfaces, toward the corresponding secondary reflecting surfaces. Alternatively, if the infrared detector comprises the planar detecting member and the primary and secondary reflecting mirror means are disposed substantially symmetrically with respect to the axis of symmetry aligned with the axis of the planar detecting member, then the secondary reflecting mirror means includes secondary reflecting surfaces disposed on respective opposite sides of the axis of symmetry, and each of the secondary reflecting surfaces is disposed adjacent to at least one of infrared ray converging members of the groups disposed in confronting relation to one of the light-detecting surfaces corresponding to the secondary reflecting surfaces. The primary reflecting mirror means includes primary reflecting surfaces disposed at least one on each side of the axis of symmetry, and each of the primary reflecting surfaces is arranged to reflect incident rays from infrared ray converging members of the groups disposed in the direction in which the light-detecting surface extends that corresponds to the primary reflecting surface, toward the secondary reflecting surface corresponding to the primary reflecting surface.

With the above arrangements, it is possible to construct an infrared human body detector having a sensitive angle ranging from at least 270 degrees to 360 degrees.

According to further features of the infrared human body detector of the present invention, at least one of the light-detecting surfaces of the infrared detector has a sensitive angle and an insensitive angle, the secondary reflecting mirror means has secondary reflecting surfaces disposed adjacent to at least one of the infrared ray converging members in the sensitive angle of the groups, and the primary reflecting mirror means has primary reflecting surfaces for reflecting incident rays from infrared ray converging members in the insensitive angle of the groups, toward the corresponding secondary reflecting surface.

BRIEF DESCRIPTION OF THE DRAWINGS

In FIG. 1, $LR_1$~$LR_3$ and $LR_1'$~$LR_3'$ represent divided infrared ray converging members, respectively, disposed in an insensitive angle of a detector PE, $LD_1$~$LD_6$ and $LD_1'$~$LD_6'$ represent divided infrared ray converging members, respectively, disposed in a sensitive angle of the detector PE, $M_1$ represents a primary reflecting mirror member, and $M_2$ represents a secondary reflecting mirror member.

In FIG. 3, LR' represents an infrared ray converging member, B' represents the central axis of rays converted by the infrared ray converging member, $M_1$ represents a primary reflecting mirror member, $M_2$ represents a secondary reflecting mirror member, and PE a detector.

FIGS. 9(*a*) and 9(*b*), S represents an infrared human body detector, and La represents a lantern.

In FIGS. 10(*a*) and 10(*b*), I1, I2 represent incident infrared rays, N represents the sensitivity axis of a detector, MR1, MR2 represent mirrors, and D the detector.

FIGS. 11(*a*) and 11(*b*) are views showing areas that are monitored by the conventional infrared human body detector. FIG. 11(*a*) shows a conical area monitored by the infrared human body detector which is installed on a ceiling. FIG. 11(*b*) shows a semicylindrical area monitored by the infrared human body detector which is installed on a wall.

BEST MODE FOR CARRYING OUT THE INVENTION

Infrared human body detectors according to preferred embodiments of the present invention will be described in detail below with reference to the accompanying drawings.

Figure 1:
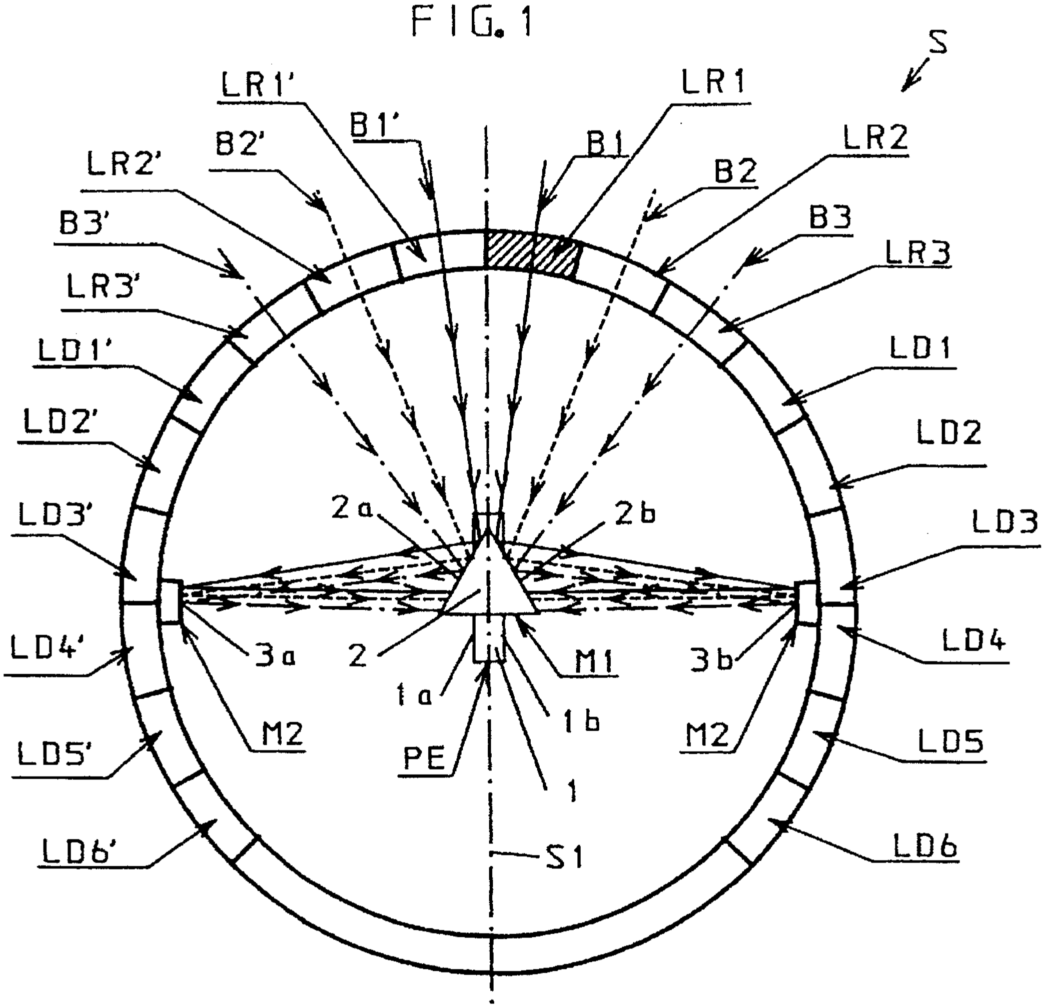
FIG. 1 is a plan view of an infrared human body detector S according to a first embodiment of the present invention.
Figure 8A:
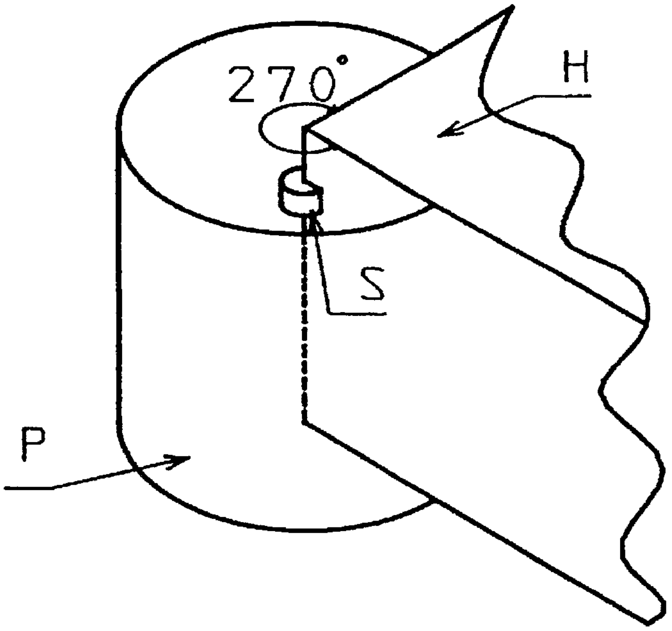
FIGS. 8(*a*) and 8(*b*) are perspective views of typical areas that can be monitored by infrared human body detectors according to the present invention which have respective sensitive angles of 180 degrees or more and 270 degrees or more.
Figure 8B:
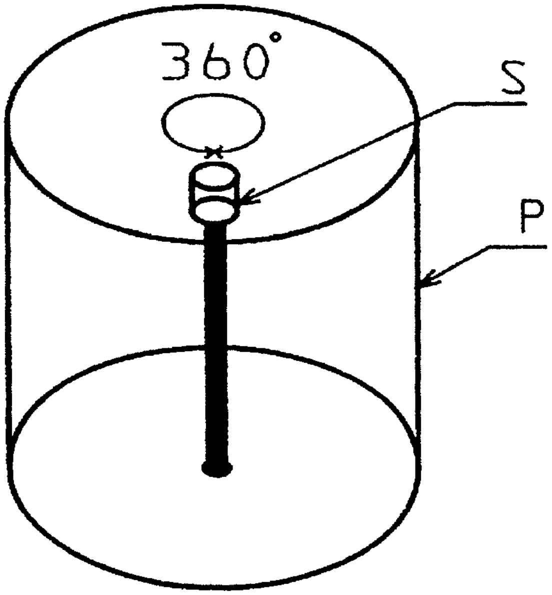
Figure 9:
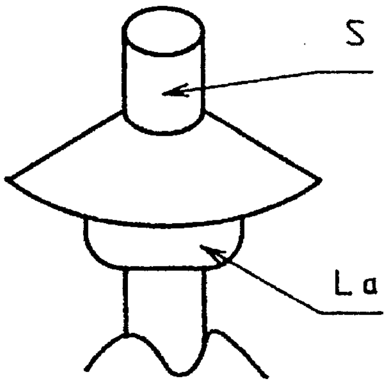
FIGS. 9(*a*) and 9(*b*) are views showing applications of the infrared human body detector according to the present invention, which has a sensitive angle of 270 degrees or more, used to monitor a large garden.
Figure 9:
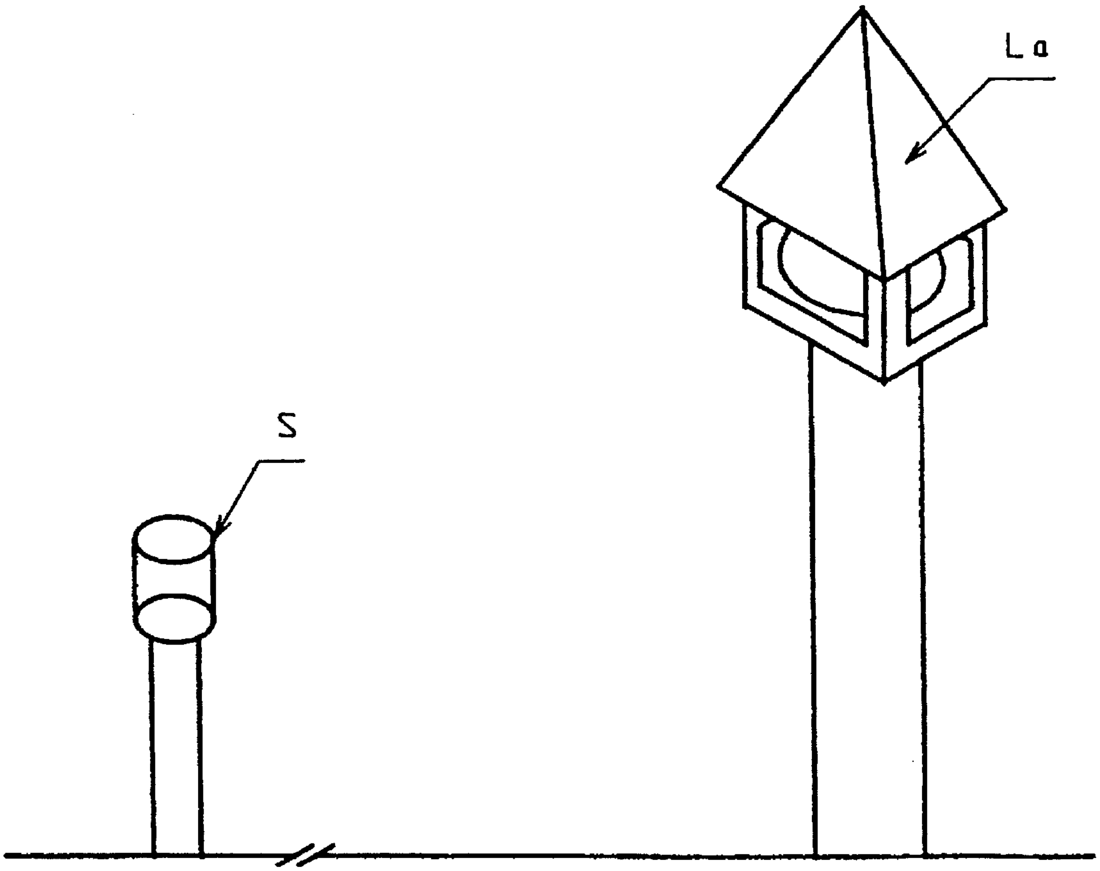

FIG. 1 shows an infrared human body detector S according to a first embodiment of the present invention which has a sensitive angle ranging from 180 degrees to 270 degrees. As shown in FIG. 11(*a*), a conventional infrared human body detector D1 has a detectable area of conical shape, and the bottom of the detectable area of conical shape extends 360 degrees about the detector axis. Therefore, the conventional infrared human body detector D1 may be confused with present invention, but actually the conventional detector D1 has an insensitive angle of greater than 180° as shown in FIG. 11(*a*). Further, as shown in FIG. 8(*a*), for example, the infrared human body detector S according to the first embodiment has a monitorable area matching a corner of a house H, or approximately 270°, and differs from the conventional infrared human body detector D1 shown in FIG. 11(*a*).

As shown in FIG. 1, the infrared human body detector S comprises a detector PE, e.g., a CSL052-type detector manufactured by Chartland Sensor Co., England, positioned in a plane, and a group of divided infrared ray converging members $LR_1'$~$LR_3'$, $LD_1'$~$LD_6'$ and $LR_1$~$LR_3$, $LD_1$~$LD_6$ disposed concentrically around the detector PE through an angle of 180 degrees or more, e.g., an angle of about 270 degrees in FIG. 1. In FIG. 1, the infrared ray converging members $LR_1'$~$LR_3'$, $LD_1'$~$LD_6'$ and $LR_1$~$LR_3$, $LD_1$~$LD_6$ are arranged substantially symmetrically with respect to an axis $S_1$ of symmetry aligned with the axis of the detector PE. However, the infrared ray converging members of the infrared human body detector S are not limited to the illustrated symmetric layout, but may be arranged asymmetrically such that two of infrared ray converging members LD', LD and/or LR', LR may be disposed on a left-hand side of the axis and three of them on a right-hand side of the axis. As will be evident from the following description, such a modified arrangement will function without failure, and falls within the scope of the claims of the present invention.

The detector PE includes a planar member 1 having light-detecting surfaces 1*a*, 1*b* on its opposite principal surfaces, and the axis $S_1$ of symmetry is aligned with the axis of the planar member 1 in this embodiment. Divided infrared ray converging members, i.e., Fresnel lenses, $LR_1'$~$LR_3'$ and $LR_1$~$LR_3$ are disposed on sides perpendicular to planes in which the light-detecting surfaces 1*a*, 1*b* lie, i.e., are disposed in the direction in which the light-detecting surfaces 1*a*, 1*b* extend and positioned in an insensitive angle of the detector PE. Groups of rays $B_1'$~$B_3'$ and $B_1$~$B_3$ which are converged by the Fresnel lenses $LR_1'$~$LR_3'$ and $LR_1$~$LR_3$ are reflected by primary reflecting surfaces 2*a*, 2*b* of a primary reflecting mirror member $M_1$ disposed inwardly of the infrared ray converging members LR', LR and LD', LD, i.e., reflecting surfaces on two adjacent sides of a member 2 that is triangular when viewed in plan, and the reflected rays are applied to and reflected by respective secondary reflecting surfaces 3*a*, 3*b* of second reflecting mirror members $M_2$ which are located in substantially symmetrical left- and right-hand positions. The reflected rays are then applied to the light-detecting surfaces 1*a*, 1*b* of the detector PE at angles of good detection sensitivity. The second reflecting mirror members $M_2$, i.e., the secondary reflecting surfaces 3*a*, 3*b* thereof, should preferably be sufficiently small as compared with the surface areas of the infrared ray converging members LD', LD because the loss of incident rays directly applied from behind the adjacent infrared ray converging members LD' or LD will be reduced. Insofar as the secondary reflecting surfaces 3*a*, 3*b* are positioned in the path of infrared rays for the above purpose and capable of introducing reflected rays from the primary reflecting mirror member $M_1$ into the sensitive angle of the detector PE and apply them to the light-detecting surfaces 1*a*, 1*b*, the secondary reflecting surfaces 3*a*, 3*b* may be disposed other than in symmetrical left- and right-hand positions adjacent to the infrared ray converging members LD', LD as shown, or may be positioned other than with one in each of the left- and right-hand positions as shown. For example, plural secondary reflecting surfaces may be positioned in each of the left- and right-hand positions. In FIG. 1, the secondary reflecting mirror members $M_2$ are located adjacent to the boundaries between the infrared ray converging members $LD_3'$, $LD_4'$ and $LD_3$, $LD_4$ in the symmetrical left- and right-hand positions from which incident rays are applied directly to the light-detecting surfaces 1*a*, 1*b* of the detector PE.

As can be understood from above description, the infrared ray converging members $LR_1'$~$LR_3'$ and $LR_1$~$LR_3$ are disposed within the insensitive angle of the infrared detector PE, and the infrared ray converging members $LD_1'$~$LD_6'$ and $LD_1$~$LD_6$ are disposed within the sensitive angle of the infrared detector PE.

More specific principles of the infrared human body detector S according to this embodiment will be described below with reference to the perspective view of FIG. 3.

Figure 3:
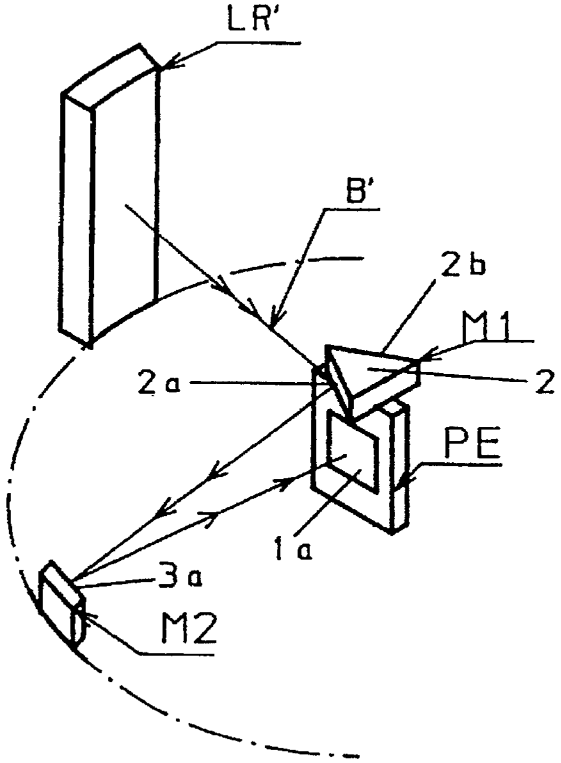
FIG. 3 is a partial perspective view illustrating the principles of the infrared human body detector S according to the first embodiment shown in FIG. 1.
Figure 4:
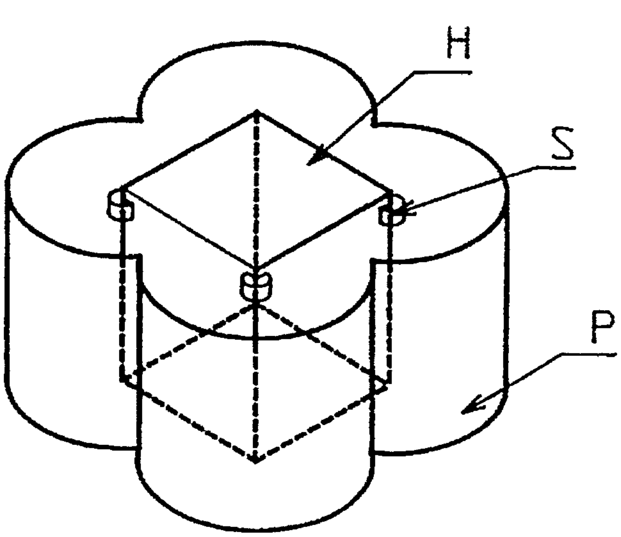
FIG. 4 is a view showing an area which is monitored by the infrared human body detector S according to the first embodiment shown in FIG. 1, which has a sensitive angle of about 270 degrees, installed on a typical house H.

As shown in FIG. 3, an infrared ray B' converged by a lens LR' is first reflected by a reflecting surface 2*a* of a primary reflecting mirror member $M_1$ disposed above a detector PE (the primary reflecting mirror member $M_1$ need not necessarily be disposed above the detector PE as shown, but may be placed in other positions depending on the purpose of the detector), then applied to a reflecting surface 3*a* of a secondary reflecting mirror member $M_2$ in the direction indicated by the arrows, and then reflected thereby and applied to a light-detecting surface 1*a* of the detector PE. The principles of the infrared human body detector S on the other side of the axis $S_1$ of symmetry are the same as described above, and will not be described below.

Figure 2:
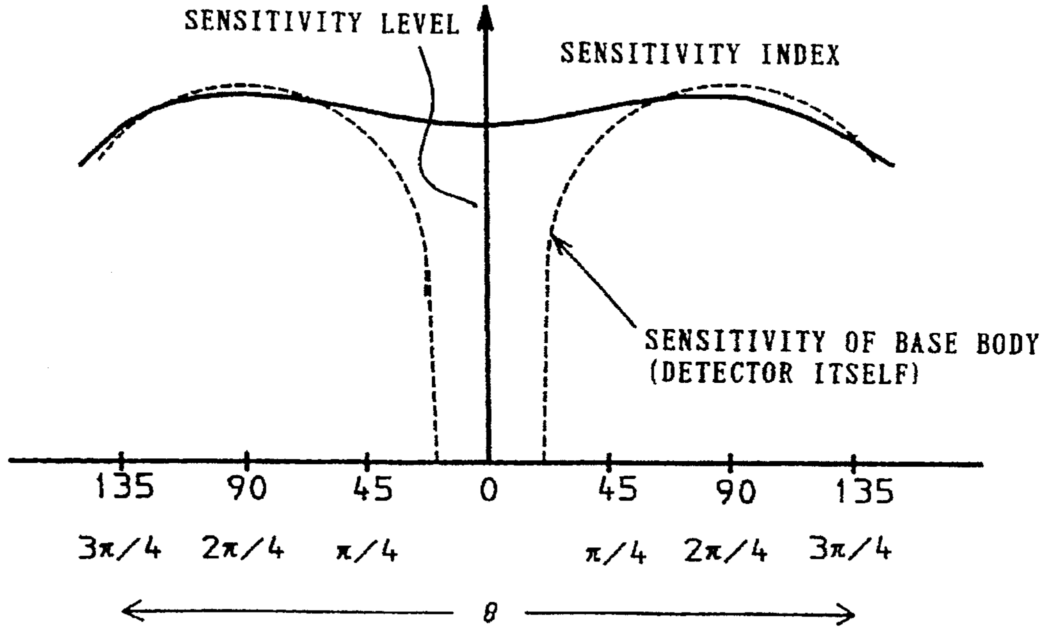
FIG. 2 is a diagram showing the index of a detection sensitivity level, indicated by the solid-line curve, with respect to the entire angle θ of the infrared human body detector S according to the first embodiment shown in FIG. 1.
Figure 10A:
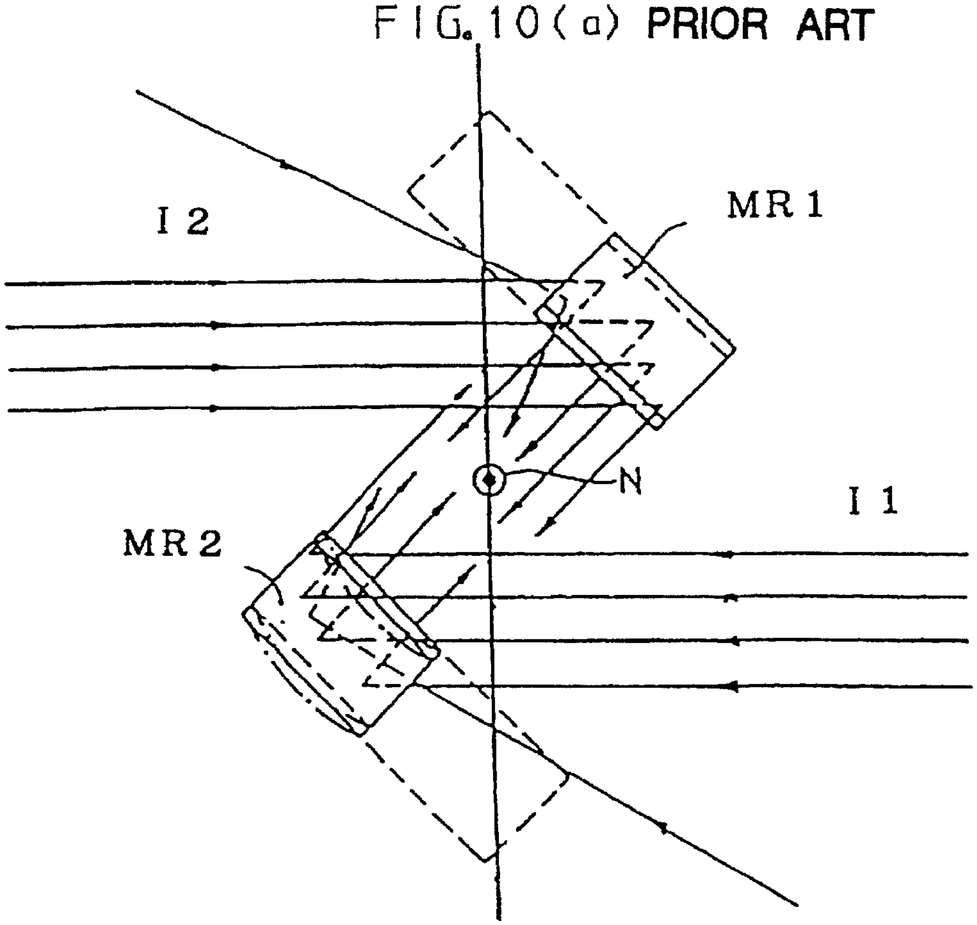
FIG. 10(a) PRIOR ART
FIGS. 10(*a*) and 10(*b*) are plan and side elevational views, respectively, of an optical system of a conventional infrared human body detector.
Figure 10B:
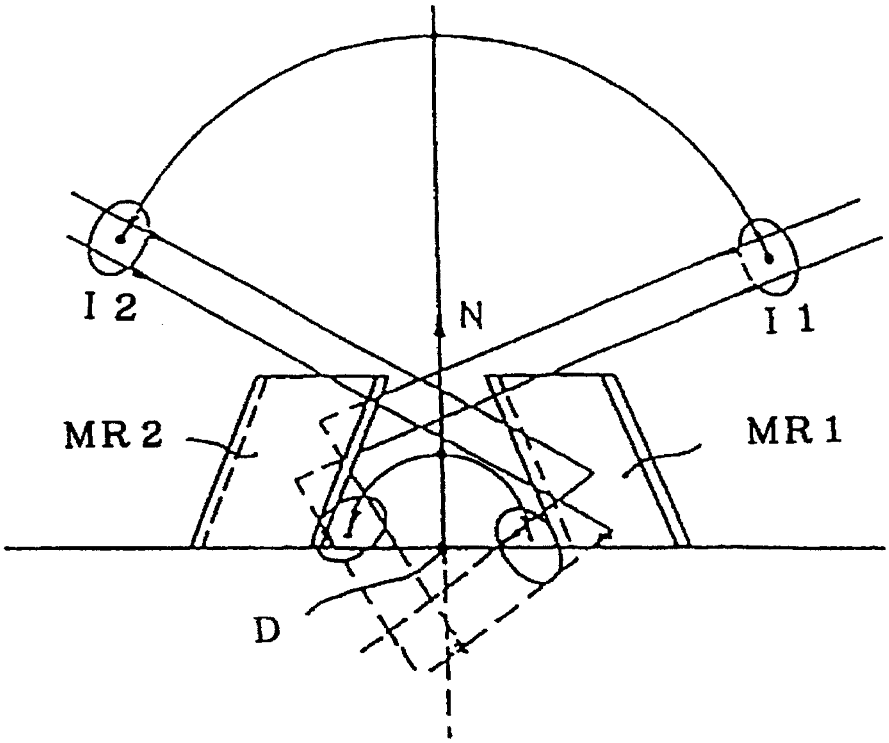
FIG. 10(b) PRIOR ART

In the conventional infrared human body detector D2 disclosed in U.S. Pat. No. 4,644,147, as shown in the plan and side elevational views of FIGS. 10(*a*) and 10(*b*), rays I1, I2 other than light directly applied in an N direction are introduced indirectly into the detector by respective mirrors MR1, MR2 located in respective left- and right-hand positions. Since the conventional infrared human body detector D2 has a wide detectable area, it can be used in a monitorable area P shown in FIG. 11(*b*). However, two infrared human body detectors D2 have to be employed to cover a corner of the house H as shown in FIG. 8(*a*). According to this first embodiment of the present invention, the single infrared human body detector S can sufficiently serve the purpose of covering a corner of the house H as indicated by its sensitive angle and detection sensitivity level in FIG. 2.

In the first embodiment, the divided infrared ray converging members LD, LR may also be three-dimensionally arranged a direction perpendicular to the sheet of FIG. 1, and the primary and secondary reflecting mirror members $M_1$, $M_2$ may be added in combination with such a three-dimensional assembly. Such an arrangement is an application of the first embodiment, and naturally falls in the scope of the claims of the present invention.

An infrared human body detector S' according to a second embodiment of the present invention which has a sensitive angle of 270 degrees or more, e.g., a sensitive angle of 360 degrees, will be described below. As shown in the plan view of FIG. 5, the infrared human body detector S' comprises a detector PE positioned in a plane, divided infrared ray converging members $LR_1'$~$LR_6'$, $LD_1'$~$LD_6'$ and $LR_1$~$LR_6$, $LD_1$~$LD_6$ disposed concentrically around the detector PE, and primary and secondary reflecting mirror members $M_1'$, $M_2$ disposed substantially symmetrically with respect to an axis $S_2$ of symmetry aligned with the axis of the detector PE. The principles of the infrared human body detector S' will be described below with reference to the perspective view of FIG. 7.

Figure 7:
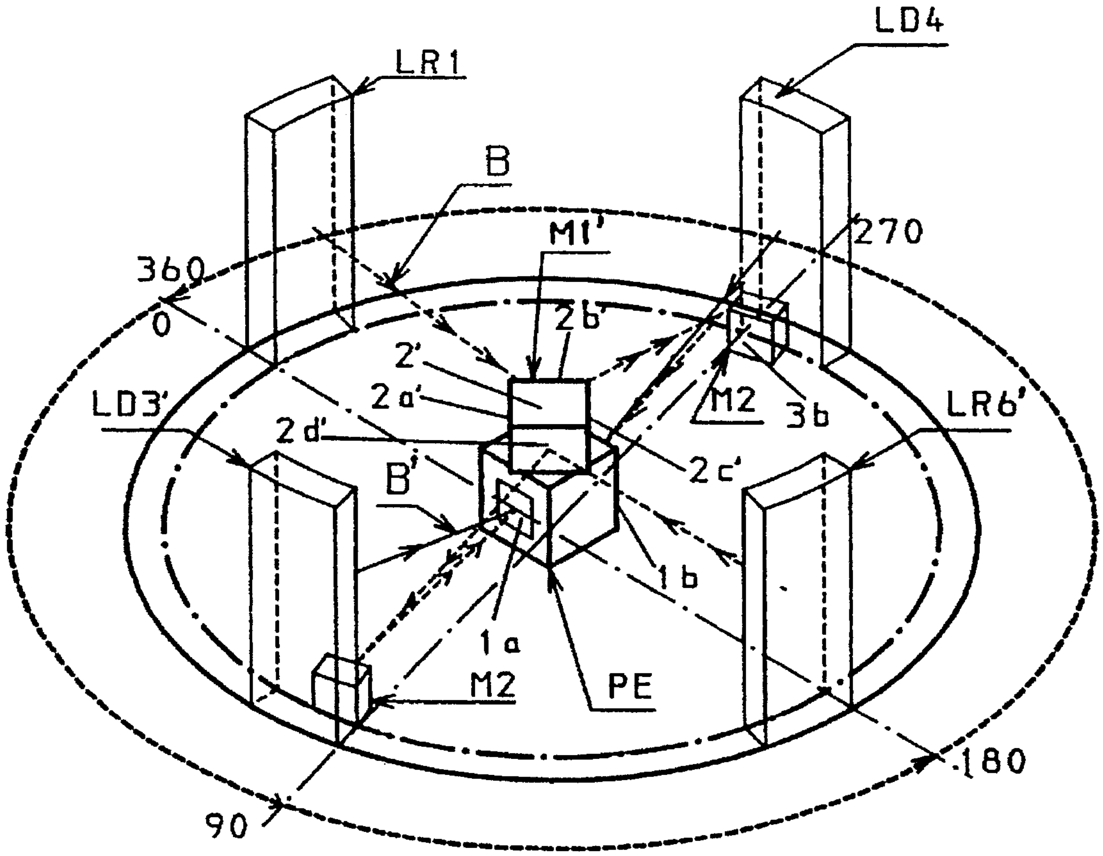
FIG. 7 is a partial perspective view illustrating the principles of the principles of the infrared human body detector S' according to the second embodiment shown in FIG. 5, which has a sensitive angle of 270 degrees or greater, the sensitive angle being 360 degrees in FIG. 7. Those parts which are identical to those shown in FIG. 5 are denoted by identical reference characters.

In FIG. 7, at least the infrared ray converting members $LR_6'$, $LR_1$ of the infrared ray converging members $LR_1'$~$LR_6'$ and $LR_1$~$LR_6$ which are disposed in confronting relation to sides perpendicular to face and back surfaces having light-detecting surfaces 1*a*, 1*b* of the detector PE and which are disposed in an insensitive angle of the detector PE apply converged rays B' and B to respective primary reflecting surfaces 2*b'*, 2*d'* of a primary reflecting mirror member $M_1'$ which has primary reflecting surfaces 2*a'*~2*d'* on sides of a member 2' that is substantially lozenge-shaped in plan, the primary reflecting mirror member $M_1'$ being disposed above the detector PE (again the primary reflecting mirror member $M_1'$ need not necessarily be disposed above the detector PE, but may be positioned on a side or base of the detector PE without departing from the scope of the present invention). The rays reflected by the primary reflecting surfaces 2*b'*, 2*d'* are applied to respective secondary reflecting surfaces 3*b*, 3*a* of left and right secondary reflecting mirror members $M_2$, and reflected thereby and applied to the light-detecting surfaces 1*b*, 1*a* of the detector PE as indicated by the arrows. The rays are applied to the light-detecting surfaces 1*b*, 1*a* within an angle of sufficiently effective detection sensitivity selected based on the recognition of basic angle-dependent sensitivity characteristics of the detector PE which may be a CSL052-type detector referred to above.

Converged rays B' and B from those infrared ray converging members LD', LD (the infrared ray converging members $LD_3'$, $LD_4$ in FIG. 7) which are capable of converging infrared rays and directly applying them to the detector PE and are positioned in the sensitive angle of the detector PE can be reflected by the reflecting surfaces 3*a*, 3*b* of the secondary reflecting mirror members $M_2$ having a sufficiently small surface area as compared with the surface areas of the infrared ray converging members LD', LD, and applied to the light-detecting surfaces 1*a*, 1*b* of the detector PE without substantially losing the converged energy.

Figure 6:
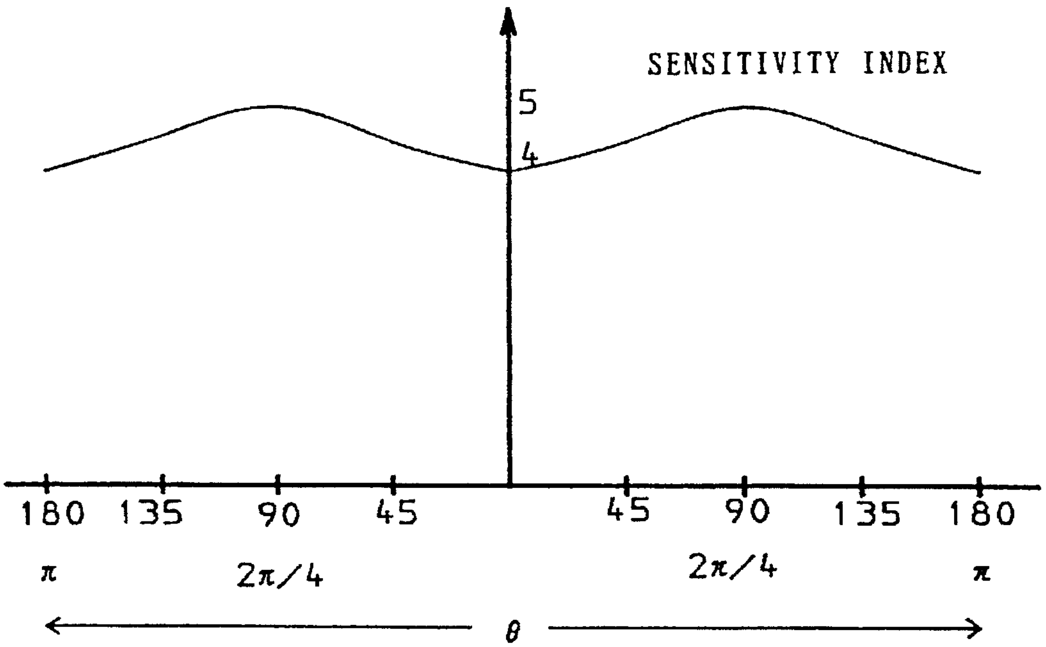
FIG. 6 is a diagram showing the entire angle θ of the infrared human body detector S' according to the second embodiment shown in FIG. 5 and the index of a detection sensitivity level thereof.

With the above arrangement, the relationship between detection angles and detection sensitivity indexes of the infrared human body detector S' according to the second embodiment exhibits excellent characteristics over the full angle range of 360 degrees as shown in FIG. 6.

Figure 5:
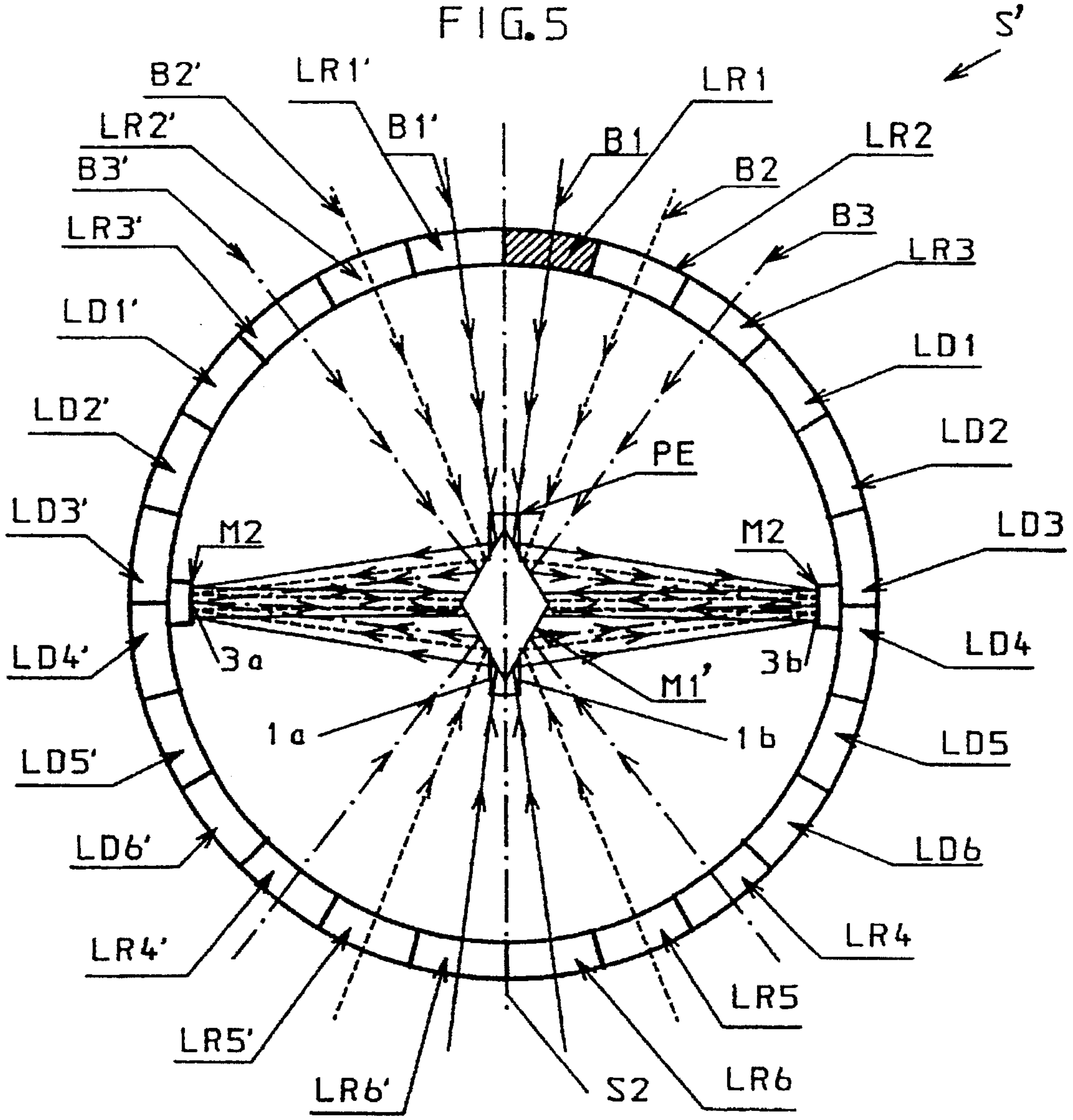
FIG. 5 is a plan view of an infrared human body detector S' according to a second embodiment of the present invention, which has a sensitive angle of 270 degrees or greater, the sensitive angle being of 360 degrees in FIG. 5.

In FIG. 5, the infrared ray converging members $LR_1'$~$LR_6'$, $LD_1'$~$LD_6'$ and $LR_1$~$LR_6$, $LD_1$~$LD_6$ are arranged substantially symmetrically with respect to the axis $S_2$ of symmetry aligned with the axis of the detector PE. However, the infrared ray converging members of the infrared human body detector S' are not limited to the illustrated symmetric layout, but may be arranged asymmetrically such that five of infrared ray converging members LD', LD and/or LR', LR may be disposed on a left-hand side of the axis and six of them on a right-hand side of the axis. As will be evident from the above description, such a modified arrangement will function without fail, and falls within the scope of the claims of the present invention.

Insofar as the secondary reflecting surfaces 3*a*, 3*b* are positioned in the path of infrared rays for the above purpose and capable of introducing reflected rays from the primary reflecting mirror member $M_1$ into the sensitive angle of the detector PE and apply them to the light-detecting surfaces 1*a*, 1*b*, the secondary reflecting surfaces 3*a*, 3*b* need not be disposed in symmetrical left- and right-hand positions adjacent to the infrared ray converging members LD', LD as shown, or need not be positioned one in each of the left- and right-hand positions, but instead plural secondary reflecting surfaces may be positioned in each of the left- and right-hand positions. In FIG. 5; the secondary reflecting mirror members $M_2$ are located adjacent to the boundaries between the infrared ray converging members $LD_3'$, $LD_4'$ and $LD_3$, $LD_4$ in the symmetrical left- and right-hand positions from which incident rays are applied directly to the light-detecting surfaces 1*a*, 1*b* of the detector PE.

The divided infrared ray converging members LD, LR may also be three-dimensionally arranged in a direction perpendicular to the sheet of FIG. 5, and the primary and secondary reflecting mirror members $M_1'$, $M_2$ may be added in combination with such a three-dimensional assembly. Such an arrangement is an application of the second embodiment, and naturally falls in the scope of the claims of the present invention.

As described above, each of the infrared human body detectors S, S' according to the present invention is characterized by an infrared detector PE having at least one of light-detecting surfaces 1*a*, 1*b* and disposed in a plane, groups LR', LD' and LR, LD of divided infrared ray converging members disposed in the same plane about the infrared detector PE, e.g., concentrically thereto, in surrounding relation thereto, primary reflecting mirror means $M_1$, $M_1'$ disposed inwardly of the groups of divided infrared ray converging members for reflecting, in a primary fashion, rays B', B applied inwardly through the respective groups of divided infrared ray converging members, and secondary reflecting mirror means $M_2$ disposed inwardly of the groups of divided infrared ray converging members for introducing the reflected rays from the primary reflecting mirror means within a sensitive angle of the infrared detector PE to apply the rays to the light-detecting surfaces thereof, the secondary reflecting mirror means $M_2$ having a reflecting surface sufficiently small as compared with the surface areas of the infrared ray converging members. The secondary reflecting mirror means $M_2$ includes at least one of secondary reflecting surfaces 3*a*, 3*b* disposed adjacent to at least one of the infrared ray converging members $LD_3'$, $LD_4'$ and $LD_3$, $LD_4$ of the groups which are disposed in confronting relation to at least one of the light-detecting surfaces 1*a*, 1*b*. The primary reflecting mirror means $M_1$, $M_1'$ include at least one of primary reflecting surfaces 2*a*, 2*b* or 2*a'*~2*d'* for reflecting incident rays from the infrared ray converging members LR' and LR disposed in the direction in which the light-detecting surfaces 1*a*, 1*b* extend, toward the secondary reflecting surface 3*a* or 3*b*.

If the infrared detector PE comprises a planar detecting member 1 having light-detecting surfaces 1*a*, 1*b* on its opposite principal surfaces which extend in a direction perpendicular to the plane referred to above, then the secondary reflecting mirror means $M_2$ includes secondary reflecting surfaces 3*a*, 3*b* disposed in respective left- and right-hand positions on opposite sides of the axis $S_1$ or $S_2$ of the planar detecting member 1, and each of the secondary reflecting surfaces 3*a*, 3*b* is disposed adjacent to at least one of some of the infrared ray converging members LD', LD disposed in confronting relation to one of the light-detecting surfaces 1*a*, 1*b* on the sides corresponding to the secondary reflecting surfaces 3*a*, 3*b*. The primary reflecting mirror means $M_1$ or $M_1'$ includes primary reflecting surfaces 2*a*, 2*b* or 2*a'*~2*d'* disposed at least one on each side of the axis $S_1$ or $S_2$ of the planar detecting member 1. Each of the primary reflecting surfaces 2*a*, 2*b* or 2*a'*~2*d'* is arranged to reflect incident rays from the infrared ray converging members LR', LR disposed in the direction in which one of the light-detecting surfaces 1*a*, 1*b* extends on the sides corresponding to the primary reflecting surfaces, toward the corresponding secondary reflecting surfaces 3*a*, 3*b*. Alternatively, if the primary and secondary reflecting mirror means $M_1$ or $M_1'$, $M_2$ are disposed substantially symmetrically with respect to the axis $S_1$ or $S_2$ of symmetry aligned with the axis of the planar detecting member 1, then the secondary reflecting mirror means $M_2$ includes secondary reflecting surfaces 3*a*, 3*b* disposed on respective opposite sides of the axis $S_1$ or $S_2$ of symmetry, and each of the secondary reflecting surfaces 3*a*, 3*b* is disposed adjacent to at least one of infrared ray converging members $LD_3'$, $LD_4'$ or $LD_3$, $LD_4$ of the groups disposed in confronting relation to one of the light-detecting surfaces 1*a*, 1*b* corresponding to the secondary reflecting surfaces 3*a*, 3*b*. The primary reflecting mirror means $M_1$ in the first embodiment includes primary reflecting surfaces 2*a*, 2*b* disposed at least one on each side of the axis $S_1$ of symmetry. Each of the primary reflecting surfaces 2*a*, 2*b* is arranged to reflect incident rays from infrared ray converging members $LR_1'$~$LR_3'$ or $LR_1$~$LR_3$ of the groups disposed in the direction in which the light-detecting surface 1*a* or 1*b* extends that corresponds to the primary reflecting surface 2*a* or 2*b*, toward the secondary reflecting surface 3*a* or 3*b* corresponding to the primary reflecting surface 2*a* or 2*b*. The primary reflecting mirror means $M_1'$ in the second embodiment includes primary reflecting surfaces 2*a'*~2*d'* disposed at least one on each side of the axis $S_2$ of symmetry. Each of the primary reflecting surfaces 2*a'*~2*d'* is arranged to reflect incident rays from infrared ray converging members $LR_1'$~$LR_6'$ or $LR_1$~$LR_6$ of the groups disposed in the direction in which the light-detecting surface 1*a* or 1*b* extends that corresponds to the primary reflecting surfaces 2*a'*, 2*d'* or 2*b'*, 2*c'*, toward the secondary reflecting surface 3*a* or 3*b* corresponding to the primary reflecting surfaces 2*a'*, 2*d'* or 2*b'*, 2*c'*. With the above arrangements, it is possible to construct an infrared human body detector having a sensitive angle ranging from at least 270 degrees to 360 degrees.

According to further features of the infrared human body detector of the present invention, at least one of the light-detecting surfaces 1*a*, 1*b* of the infrared detector PE has a sensitive angle and an insensitive angle, the secondary reflecting mirror means $M_2$ has secondary reflecting surfaces 3*a*, 3*b* disposed adjacent to at least one of infrared ray converging members $LD_1'$~$LD_6'$ and $LD_1$~$LD_6$ in the sensitive angle of the groups LR', LR, LD', LD, and the primary reflecting mirror means $M_1$ (or $M_1'$) has primary reflecting surfaces 2*a*, 2*b* (or 2*a'*~2*d'*) for reflecting incident rays from infrared ray converging members $LR_1'$~$LR_6'$ (or $LR_1'$~$LR_6'$) and $LR_1$~$LR_6$ (or $LR_1$~$LR_6$) in the insensitive angle of the groups LR', LR, LD', LD, toward the secondary reflecting surface 3*a* or 3*b*.

INDUSTRIAL APPLICABILITY

An infrared human body detector according to the present invention is suitable for automatically turning on and off a lamp in a garden or the like, or for use as an infrared human body detector for crime prevention. Although there have been described what are at present considered to be the preferred embodiments of the invention, it will be understood that variations and modifications may be made thereto without departing from the spirit and essence of the invention. The scope of the invention is indicated by the appended claims, rather than by the foregoing description.

I claim:

1. An infrared human body detector comprising:

an infrared detector having at least one light-detecting surface and disposed in a plane;

groups of divided infrared ray converging members disposed in said plane about said infrared detector as a center in surrounding relation thereto;

primary reflecting mirror means disposed adjacent to said infrared detector and centrally located within said groups of divided infrared ray converging members for reflecting, in a primary fashion, rays applied inwardly through the respective groups of divided infrared ray converging members; and secondary reflecting mirror means disposed between said detector and said infrared ray converging members for introducing the reflected rays from said primary reflecting mirror means within a sensitive angle of said infrared ray detector to apply the rays to the at least one light-detecting surface thereof, said secondary reflecting mirror means having a reflecting surface sufficiently smaller as compared with the surface areas of said infrared ray converging members.

2. An infrared human body detector according to claim 1, wherein said groups of infrared ray converging members comprise groups of Fresnel lenses, said Fresnel lenses being disposed concentrically about said infrared detector in an angle of at least about 270 degrees.

3. An infrared human body detector according to claim 1, wherein said secondary reflecting mirror means includes a secondary reflecting surface disposed adjacent to at least one of the infrared ray converging members of the groups which are disposed in confronting relation to said light-detecting surface, and said primary reflecting mirror means includes a primary reflecting surface for reflecting incident rays from the infrared ray converging members of the groups disposed in the direction in which the light-detecting surface extends, toward said secondary reflecting surface.

4. An infrared human body detector according to claim 3, wherein said secondary reflecting surface is disposed adjacent a boundary between two of said infrared ray converging members disposed in confronting relation to said light-detecting surface.

5. An infrared human body detector according to claim 1, wherein said infrared detector comprises a planar detecting member having light-detecting surfaces on its opposite principal surfaces which extend in a direction perpendicular to said plane, said secondary reflecting mirror means including secondary reflecting surfaces disposed respectively on opposite sides of an axis of said planar detecting member, each of said secondary reflecting surfaces being disposed adjacent to at least one of infrared ray converging members of the groups disposed in confronting relation to one of said light-detecting surfaces on the sides corresponding to the secondary reflecting surfaces.

6. An infrared human body detector according to claim 1, wherein said infrared detector comprises a planar detecting member having light-detecting surfaces on its opposite principal surfaces which extend in a direction perpendicular to said plane, said primary and secondary reflecting mirror means being disposed substantially symmetrically with respect to an axis of symmetry aligned with the axis of said planar detecting member, said secondary reflecting mirror means including secondary reflecting surfaces disposed on respective opposite sides of said axis of symmetry, each of said secondary reflecting surfaces being disposed adjacent to at least one of infrared ray converging members of the groups disposed in confronting relation to one of said light-detecting surfaces corresponding to said secondary reflecting surfaces, said primary reflecting mirror means including primary reflecting surfaces disposed at least one on each side of said axis of symmetry, each of said primary reflecting surfaces being arranged to reflect incident rays from said infrared ray converging members disposed in the direction in which one of said light-detecting surfaces extends that corresponds to said primary reflecting surface, toward the corresponding secondary reflecting surface.

7. An infrared human body detector according to claim 1, wherein said at least one light-detecting surface of said infrared detector has a sensitive angle and an insensitive angle, said secondary reflecting mirror means having secondary reflecting surfaces disposed adjacent to at least one of said infrared ray converging members in said sensitive angle of the groups, said primary reflecting mirror means having primary reflecting surfaces for reflecting incident rays from infrared ray converging members in said insensitive angle of the groups, toward said secondary reflecting surfaces.

8. An infrared human body detector according to claim 1, wherein said groups of infrared ray converging members concentrically surround said infrared detector through an angle of about 270°–360°.

9. An infrared human body detector according to claim 1, wherein said infrared detector has a plurality of said light-detecting surfaces facing different said groups of said infrared ray converging members, respectively.

10. An infrared ray human body detector according to claim 1, wherein said at least one light-detecting surface of said infrared detector extends perpendicular to said plane.

11. An infrared human body detector according to claim 1, wherein said primary reflecting mirror means is not disposed in said plane in which said infrared detector and said groups of divided infrared ray converging members are disposed.

12. An infrared human body detector according to claim 1, wherein each said infrared ray converging member extends in a direction perpendicular to said plane.

13. An infrared human body detector, comprising:

an infrared detector member with a least one light-detecting surface and disposed within a plane;

a plurality of divided infrared ray converging members disposed in said plane concentrically about said infrared detector member in surrounding relation thereto;

primary reflecting mirror means disposed proximate to said infrared detector member and substantially centrally located within said divided infrared ray converging members for reflecting, in a primary fashion, rays applied inwardly through at least some of said divided infrared ray converging members; and secondary reflecting mirror means disposed between said infrared detector member and said divided infrared ray converging members for secondarily reflecting the primarily reflected rays toward said at least one light detecting surface of the infrared detector member, said secondary reflecting mirror means having a reflecting surface sufficiently small as compared with the surface areas of said infrared ray converging members.

14. Infrared human body detector according to claim 13, wherein said infrared converging members are disposed within sensitive and insensitive angles of said detector member, said primary reflecting mirror means includes a primary reflecting surface for primarily reflecting rays applied inwardly from said infrared ray converging members disposed within said insensitive angle of the detecting member toward a secondary reflecting surface of said secondary reflecting mirror means, and said secondary reflecting surface is disposed adjacent to at least one of the infrared ray converging members disposed in said sensitive angle of the detector member.

15. An infrared human body detector according to claim 14, wherein said secondary reflecting surface is disposed adjacent a boundary between two of said infrared ray converging members in said sensitive angle.

16. An infrared human body detector according to claim 13, wherein said infrared ray converging members are disposed concentrically about said infrared detector member in an angle exceeding 180°.

17. An infrared human body detector according to claim 13, wherein said infrared ray converging members are disposed concentrically about said infrared detector member in an angle of about 270–360 degrees.

18. An infrared human body detector according to claim 13, wherein said infrared detector member has a plurality of said light-detecting surfaces facing different ones of said infrared ray converging members, respectively.

19. An infrared human body detector according to claim 13, wherein said at least one light-detecting surface of said infrared detector member extends in a direction perpendicular to said plane.

20. An infrared human body detector, comprising:

an infrared detector member with at least one light-detecting surface and disposed within a plane;

a plurality of divided infrared ray converging members disposed in said plane concentrically about said infrared detector member in surrounding relation thereto;

primary reflecting mirror means disposed proximate to said infrared detector member and substantially centrally located within said divided infrared ray converging members for reflecting, in a primary fashion, rays applied inwardly through at least some of said divided infrared ray converging members;

secondary reflecting mirror means disposed inwardly of said divided infrared ray converging members, for secondarily reflecting the primarily reflected rays toward said at least one light detecting surface of the infrared detector member, said secondary reflecting mirror means having a reflecting surface sufficiently smaller as compared with the surface areas of said infrared ray converging members; and said infrared detector member comprising a planar detecting member having light-detecting surfaces on its opposite principal surfaces which extend in direction perpendicular to said plane, said secondary reflecting mirror means including secondary reflecting surfaces disposed respectively on opposite sides of an axis of said planar detecting member, each of said secondary reflecting surfaces being disposed adjacent to at least one of said infrared ray converging members disposed in confronting relation to one of said light-detecting surfaces on the side corresponding to the secondary reflecting surfaces.

* * * * *

UNITED STATES PATENT AND TRADEMARK OFFICE

CERTIFICATE OF CORRECTION

PATENT NO. : 5,641,964

DATED : June 24, 1997

INVENTOR(S) : Yoshiharu Taniguchi

It is certified that error appears in the above-indentified patent and that said Letters Patent is hereby corrected as shown below:

Column 4, line 35, change "failure" to --fail--.

Signed and Sealed this

Fourteenth Day of October, 1997

Attest:

BRUCE LEHMAN

*Attesting Officer* *Commissioner of Patents and Trademarks*